United States Patent
Iyer

(10) Patent No.: US 10,523,650 B1
(45) Date of Patent: *Dec. 31, 2019

(54) RAPID SOCIAL ONBOARDING

(71) Applicant: Ravi Subramaniam Iyer, Bangalore (IN)

(72) Inventor: Ravi Subramaniam Iyer, Bangalore (IN)

(73) Assignee: INTUIT INC., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/024,641

(22) Filed: Jun. 29, 2018

Related U.S. Application Data

(63) Continuation of application No. 15/417,662, filed on Jan. 27, 2017.

(51) Int. Cl.
  *H04L 29/06* (2006.01)
  *H04L 12/26* (2006.01)
  *G06F 16/9535* (2019.01)
  *G06Q 50/00* (2012.01)

(52) U.S. Cl.
  CPC .......... *H04L 63/08* (2013.01); *G06F 16/9535* (2019.01); *H04L 43/0876* (2013.01); *H04L 63/10* (2013.01); *G06Q 50/01* (2013.01)

(58) Field of Classification Search
  CPC ...... H04L 63/08; H04L 43/0876; G06Q 50/01
  USPC .......................................................... 726/6
  See application file for complete search history.

(56) References Cited

U.S. PATENT DOCUMENTS

| | | | | |
|---|---|---|---|---|
| 8,095,432 B1* | 1/2012 | Berman | ............ | G06Q 30/0631 |
| | | | | 705/26.7 |
| 8,234,195 B1* | 7/2012 | Berhanu | ............ | G06Q 30/0201 |
| | | | | 705/35 |
| 8,423,463 B1* | 4/2013 | Matthews | ............ | G06Q 40/02 |
| | | | | 705/35 |
| 9,892,168 B1* | 2/2018 | Apreleva | ............ | G06F 17/3053 |
| 2013/0048720 A1* | 2/2013 | Lewis | ............ | G06Q 10/00 |
| | | | | 235/382 |
| 2014/0156614 A1* | 6/2014 | Krappe | ............ | G06F 17/30082 |
| | | | | 707/694 |
| 2015/0006344 A1* | 1/2015 | Saimani | ............ | G06Q 40/00 |
| | | | | 705/35 |

* cited by examiner

*Primary Examiner* — Teshome Hailu
(74) *Attorney, Agent, or Firm* — Ferguson Braswell Fraser Kubasta, PC

(57) ABSTRACT

A method may include identifying a candidate user based on a connection to an established user of a business management application (BMA). The candidate user may have an associated user identifier. The method may further include collecting, using the user identifier, social network data of the candidate user from an online social network, identifying, using the social network data of the candidate user, application programming interfaces (APIs) for collecting public data about the candidate user, retrieving, using the user identifier and an API, public data corresponding to the candidate user, generating, using the public data corresponding to the candidate user, an account creation request including the user identifier, and transmitting the account creation request to the BMA.

20 Claims, 11 Drawing Sheets

RAPID SOCIAL ONBOARDING

CROSS-REFERENCE TO RELATED APPLICATIONS

This application is a continuation application of U.S. patent application Ser. No. 15/417,662, filed on Jan. 27, 2017, and entitled: "RAPID SOCIAL ONBOARDING." This application claims benefit of U.S. patent application Ser. No. 15/417,662 under 35 U.S.C. § 120. U.S. patent application Ser. No. 15/417,662 is hereby incorporated by reference in its entirety.

BACKGROUND

First-time users of online business software applications often experience difficulty with their initial account setup, and often consult customer support agents for assistance with the onboarding process. Often a link to sign up for a new account is provided to new or potential users, who must then navigate a potentially confusing series of screens and options. A cumbersome or confusing onboarding experience may frustrate first-time users, which may result in lost customers. In contrast, a smooth and intuitive onboarding experience may accelerate the growth of the customer base, increase customer retention, and reduce the burden on customer support agents.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, one or more embodiments relate to a method including identifying a candidate user based on a connection to an established user of a business management application (BMA). The candidate user has an associated user identifier. The method further includes collecting, using the user identifier, social network data of the candidate user from an online social network, identifying, using the social network data of the candidate user, application programming interfaces (APIs) for collecting public data about the candidate user, retrieving, using the user identifier and an API, public data corresponding to the candidate user, generating, using the public data corresponding to the candidate user, an account creation request including the user identifier, and transmitting the account creation request to the BMA.

In general, in one aspect, one or more embodiments relate to a system including a computer processor and a memory including instructions that, when executed by the computer processor, cause the computer processor to identify a candidate user based on a connection to an established user of a business management application (BMA). The candidate user has an associated user identifier. The instructions further cause the computer processor to collect, using the user identifier, social network data of the candidate user from an online social network, identify, using the social network data of the candidate user, application programming interfaces (APIs) for collecting public data about the candidate user, retrieve, using the user identifier and an API, public data corresponding to the candidate user, generate, using the public data corresponding to the candidate user, an account creation request including the user identifier, and transmit the account creation request to the BMA. The system further includes a repository, configured to store at least the public data about the candidate user and the account creation request.

In general, in one aspect, one or more embodiments of the invention relate to a non-transitory computer readable medium including instructions that, when executed by a processor, perform a method including identifying a candidate user based on a connection to an established user of a business management application (BMA). The candidate user has an associated user identifier. The method further includes collecting, using the user identifier, social network data of the candidate user from an online social network, identifying, using the social network data of the candidate user, application programming interfaces (APIs) for collecting public data about the candidate user, retrieving, using the user identifier and an API, public data corresponding to the candidate user, generating, using the public data corresponding to the candidate user, an account creation request including the user identifier, and transmitting the account creation request to the BMA.

Other aspects of the invention will be apparent from the following description and the appended claims.

DETAILED DESCRIPTION

Figure 1:
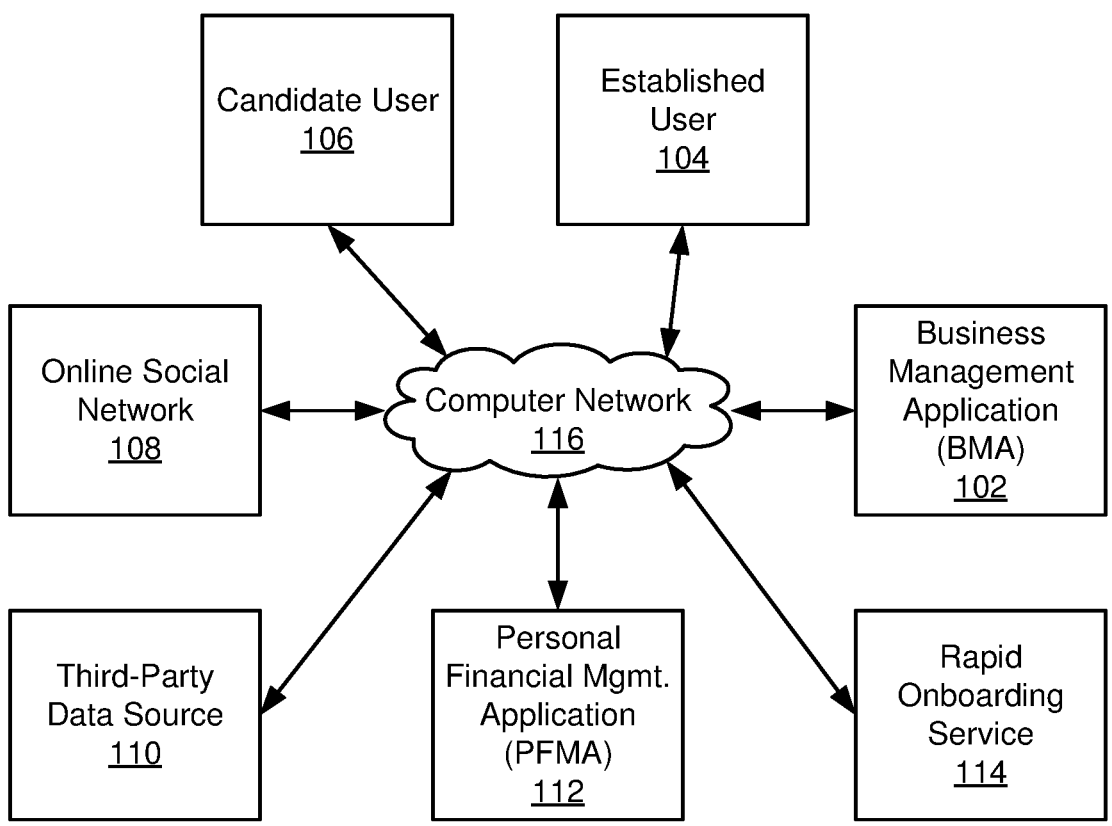
FIG. 1 and FIG. 2 show systems in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention involve onboarding a new user for a business management application (BMA). Onboarding refers to the process of familiarizing a new user with the capabilities of the BMA. In one or more embodiments of the invention, a candidate user of the BMA is identified based on an online social network connection with an established user of the BMA. For example, the candidate user may be a small business owner who does not yet use a BMA to manage his or her business, and the established user may be a friend of the candidate user who thinks the candidate user may be able to benefit from using the BMA. In one or more embodiments, the candidate user may be automatically recommended based on the strength of the social network connection to established user.

Social network data about the candidate user may be collected using an identifier associated with the candidate user. Application Programming Interfaces (APIs) for collecting public data about the candidate user may be identified using the social network data of the candidate user. In one or more embodiments of the invention, an account creation request for the candidate user may be generated using the public data and transmitted to the BMA.

Once a new account is created for the candidate user, a transaction population request may be generated and sent to the BMA. The transaction population request may include transactions extracted from a personal financial management application (PFMA) account that tracks financial transactions (e.g., for salary payments, supply purchases, etc.) of the candidate user. That is, in one or more embodiments, the candidate user is onboarded with a BMA account that is already populated with sample transactions of the candidate user, in order to facilitate a smooth first experience using the BMA. In one or more embodiments, the transactions may be filtered prior to sending the transactions to the BMA. A filtering criterion may specify that specific categories of transactions be transmitted (e.g., categories that are likely to represent business, rather than personal, transactions of the candidate user).

FIG. 1 shows a system (100) in accordance with one or more embodiments of the invention. As shown in FIG. 1, the system (100) includes a business management application (BMA) (102), an established user (104), a candidate user (106), an online social network (108), a third-party data source (110), a personal financial management application (PFMA) (112), a rapid onboarding service (114), and a computer network (116). The computer network (116) may be the network (720) described with respect to FIG. 7B.

In one or more embodiments, the BMA (102) may be an accounting application, a tax preparation application, a payroll application, a personnel application, any combination thereof, or any other application for managing an aspect of a business. In one or more embodiments, the established user (104) may be any individual using the BMA (102). The established user (104) may be a business owner, an employee, or other person associated with a business entity using the BMA (102) to manage business activities of the business entity. For example, the business activities may include accounting activities, personnel activities, payroll activities, etc. In one or more embodiments, the BMA (102) is provided by an application service provider, such as a software as a service (SaaS) provider. For example, the BMA (102) may be a SaaS accessed by the established user (104) on a subscription basis. In one or more embodiments, the BMA (102) requires a user registration procedure to obtain user specific information (e.g., security credentials) used to access the BMA (102). In one or more embodiments, the candidate user (106) may be any individual that has not undergone the user registration procedure required to access the BMA (102).

In one or more embodiments, the BMA (102) includes functionality to create a new account for a new user (e.g., the candidate user (106)). The new account may be created in response to an account creation request that includes an identifier of the new user and contact information for the new user. In one or more embodiments, BMA (102) includes functionality to create transactions corresponding to an account (e.g., financial transactions of the user associated with the account).

In one or more embodiments, the BMA (102) may provide application programming interfaces (APIs) for accessing various data included in the BMA (102). An API may provide retrieval of an output in response to receiving an input. An example of API input for the BMA (102) may be information (e.g., a user name) that identifies a user account. An example of API output for the BMA (102) may be information about a user account (e.g., transactions corresponding to the user account). The API input may also include information that specifies a time interval. For example, the API input may request the transactions corresponding to a user account over the past two days. In one or more embodiments, the transactions in the BMA (102) may be organized into categories (e.g., payroll transactions, vendor transactions, etc.).

In one or more embodiments, the established user (104) and candidate user (106) are members of an online social network (108). The online social network (108) may allow its members to establish connections and exchange information (e.g., sending messages, posting comments, etc.) among such social network connections. In one or more embodiments, the online social network (108) forms the basis of computer mediated social interaction and networking within a social network community where the established user (104) and candidate user (106) are members. In one or more embodiments, the online social network (108) is a computer mediated social network having computer servers to facilitate social interaction among its members. Examples of online social networks (108) include those provided by Facebook®, LinkedIn®, etc.

In one or more embodiments, the online social network (108) may provide APIs for access to various data included in the online social network (108). An example of API input for the social network (108) may be information (e.g., one or more user names) that identifies one or more members of the online social network (108). An example of API output for the social network (108) may be a list of connections (e.g., friends) of a specified member of the online social network (108). In one or more embodiments, the API output may be a connection strength between two members of the online social network (108) that share a connection. In one or more embodiments, the API output may be a page associated with a member of the online social network (108).

In one or more embodiments, the system (100) includes a third-party data source (110). The third-party data source (110) may be any software application that provides publicly available data. In one or more embodiments, the third-party data source (110) may be a government website that provides information about businesses. For example, the third-party data source (110) may be a government website that provides an employer identification number (EIN) or corporation number for a business associated with the candidate user (106). In one or more embodiments, the third-party data source (110) may provide APIs for accessing various data included in the third-party data source (110). For example, an API of the third-party data source (110) may provide a capability to perform a keyword search for public data (e.g., where the keyword may be a name or partial name associated with the candidate user (106), or with a business associated with the candidate user (106)).

In one or more embodiments, the system (100) includes a personal financial management application (PFMA) (112). The PFMA (112) may be any software application that tracks financial transactions associated with a user. In one or more embodiments, the PFMA (112) may track financial transactions from multiple accounts (e.g., bank accounts, credit card accounts, investment accounts, etc.) corresponding to a user. In one or more embodiments, the PFMA (112) may provide APIs for accessing various data included in the PFMA (112). For example, an API of the PFMA (112) may provide a capability to perform a keyword-based search for transactions (e.g., where the keyword may be a name or partial name associated with a product, vendor, client, etc.).

Continuing with FIG. 1, in one or more embodiments, the system (100) includes a rapid onboarding service (114). In one or more embodiments, the rapid onboarding service (114) may be implemented in hardware (e.g., circuitry), software, or any combination thereof.

Figure 2:
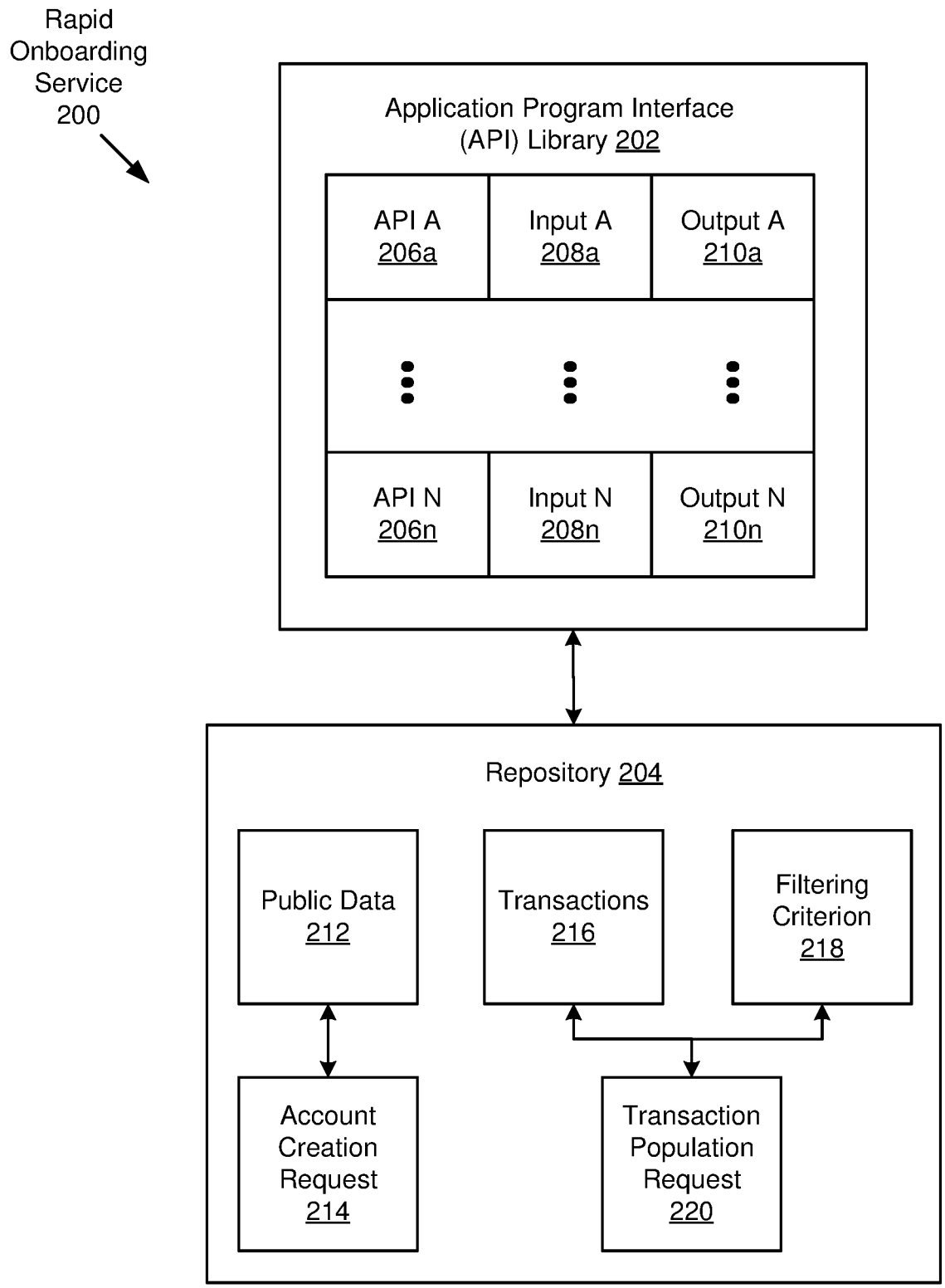

Turning to FIG. 2, in one or more embodiments, the rapid onboarding service (200) includes an application programming interface (API) library (202) and a repository (204). The API library (202) may include APIs (206a-206n). Each API (206a-206n) may include an input (208a-208n) and an output (210a-210n). In one or more embodiments, the input (208a-208n) may be an identifier (e.g., an account identifier, a user name, email address, etc.). In one or more embodiments, the input (208a-208n) may be a keyword (e.g., a name, a partial name, a substring, etc.). In one or more embodiments, the output (210a-210n) may be data (e.g., transactions (216) corresponding to an account identifier) that is related to the corresponding input (208a-208n).

In one or more embodiments, the repository (204) is any type of storage unit and/or device (e.g., a file system, database, collection of tables, or any other storage mechanism) for storing data. Further, the repository (204) may include multiple different storage units and/or devices. The multiple different storage units and/or devices may or may not be of the same type or located at the same physical site.

In one or more embodiments, the repository (204) includes public data (212), an account creation request (214), transactions (216), a filtering criterion (218), and a transaction population request (220). The public data (212) may be retrieved from the third-party data source (110) of FIG. 1. The transactions (216) may be retrieved from the PFMA (112) of FIG. 1. The rapid onboarding service (200) may include functionality to retrieve output (210a-210n) from an API (206a-206n) in response to input (208a-208n).

In one or more embodiments, the rapid onboarding service (200) may include functionality to retrieve output (210a-210n) from the online social network (108) of FIG. 1 via one or more APIs (206a-206n) of the online social network (108). For example, the rapid onboarding service (200) may retrieve output (210a-210n) corresponding to a connection strength between two members (e.g., the established user (104) and candidate user (106)) of the online social network (108) via one or more APIs (206a-206n) of the online social network (108). In one or more embodiments, the rapid onboarding service (200) may include functionality to automatically identify a candidate user of the BMA (102) of FIG. 1.

In one or more embodiments, the rapid onboarding service (200) may include functionality to retrieve output (210a-210n) from a third-party data source (110) of FIG. 1 via one or more APIs (206a-206n) of the third-party data source (110). For example, the rapid onboarding service (200) may retrieve output (210a-210n) corresponding to public data (212) from the third-party data source (110) via one or more APIs (206a-206n) of the third-party data source (110). In one or more embodiments, public data (212) is any data that may be accessed without requiring credentials. In one or more embodiments, the rapid onboarding service (200) may extract the public data (212) by "screen scraping", for example, by copying data displayed on a computing device of the established user (104) of FIG. 1 (e.g., public data (212) transmitted by a website perused by the established user (104)).

Continuing with FIG. 2, in one or more embodiments, the rapid onboarding service (200) may include functionality to generate an account creation request (214). In one or more embodiments, the account creation request (214) includes sufficient information for the BMA (102) of FIG. 1 to create a new account. For example, the account creation request (214) may include an identifier and contact information for the candidate user (106) of FIG. 1. The account creation request (214) may be based, in part, on public data (212) (e.g., public data (212) retrieved from one or more third-party data sources (110) of FIG. 1). In one or more embodiments, the rapid onboarding service (200) may include functionality to transmit the account creation request (214) to the BMA (102). For example, the account creation request (214) may be transmitted to the BMA (102) via email. Alternatively, the account creation request (214) may be transmitted to the BMA (102) via an API (206a-206n) of the BMA (102).

In one or more embodiments, the rapid onboarding service (200) may include functionality to retrieve output (210a-210n) from a PFMA (112) of FIG. 1 via one or more APIs (206a-206n) of the PFMA (112). In one or more embodiments, the rapid onboarding service (200) may retrieve output (210a-210n) corresponding to transactions (216) from the PFMA (112) via one or more APIs (206a-206n) of the PFMA (112). In one or more embodiments, the transactions (216) include a record of purchases, payments, income, etc. corresponding to an account of the PFMA (112). In one or more embodiments, the PFMA (112) organizes transactions (216) into categories. In one or more embodiments, transactions (216) of the PFMA (112) are uncategorized.

In one or more embodiments, the rapid onboarding service (200) may include functionality to filter transactions (216) according to a filtering criterion (218). In one or more embodiments, the filtering criterion (218) may be based on one or more filtering rules. For example, a filtering rule may specify that one or more transaction categories (e.g., payroll payments, vendor payments, income) be included in a collection of filtered transactions (216). In one or more embodiments, the filtering criterion (218) may specify a time interval such that only the transactions (216) occurring within the time interval are included in the filtered transactions (216).

In one or more embodiments, the filtering criterion (218) may include a confidence measure based on a measure of the reliability of a transaction category associated with one or more transactions (216). In one or more embodiments, the transaction category may be based on one or more categorization rules (e.g., if the retrieved transactions (216) are uncategorized). For example, the confidence measure may be higher for a transaction category whose associated transactions repeat each week than for a transaction category whose associated filtered transactions repeat irregularly (e.g., the transactions repeat only for a majority of weeks).

In one or more embodiments, the rapid onboarding service (200) may include functionality to generate a transaction population request (220). In one or more embodiments, the transaction population request (220) includes transactions (216) and an identifier of an account of the BMA (102) of FIG. 1 (e.g., an account created in response to the account creation request (214)). In one or more embodiments, the transactions (216) may be filtered according to a filtering criterion (218).

In one or more embodiments, the rapid onboarding service (200) may include functionality to transmit the transaction population request (220) to the BMA (102). The transaction population request (220) may be transmitted to the BMA (102) via email. Alternatively, the transaction population request (220) may be transmitted to the BMA (102) via an API (206*a*-206*n*) of the BMA (102).

While FIG. 1 and FIG. 2 show a configuration of components, other configurations may be used without departing from the scope of the invention. For example, various components may be combined to create a single component. As another example, the functionality performed by a single component may be performed by two or more components.

Figure 3:
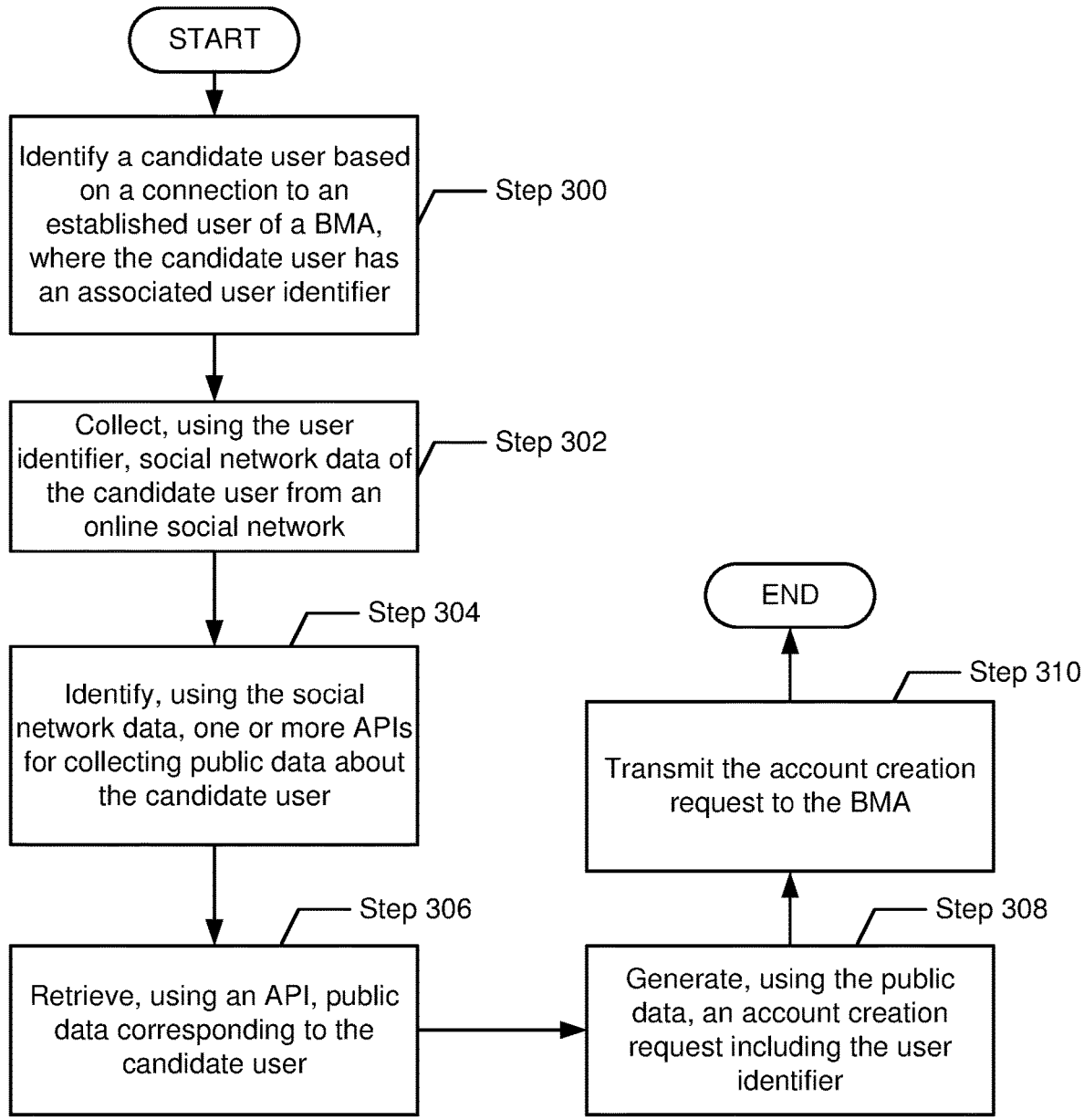
FIG. 3, FIG. 4, and FIG. 5 show flowcharts in accordance with one or more embodiments of the invention.

FIG. 3 shows a flowchart in accordance with one or more embodiments of the invention. The flowchart depicts a process for onboarding a candidate user for a business management application (BMA). In one or more embodiments, the process described in reference to FIG. 3 may be practiced using the system (100) described in reference to FIG. 1 and FIG. 2 above, and/or involving the computing system (700) described in reference to FIG. 7A, and/or the client device (726) described in reference to FIG. 7B. In one or more embodiments of the invention, one or more of the steps shown in FIG. 3 may be omitted, repeated, and/or performed in a different order than the order shown in FIG. 3. Accordingly, the scope of the invention should not be considered limited to the specific arrangement of steps shown in FIG. 3.

Initially, in Step 300, a candidate user is identified based on a connection to an established user of a business management application (BMA). In one or more embodiments, the candidate user has an associated user identifier (e.g., an email address). In one or more embodiments, the connection between the established user and the candidate user may be represented in an online social network in which both the established user and the candidate user are members.

In Step 302, social network data of the candidate user is collected, using the user identifier, from an online social network. In one or more embodiments, the social network data of the candidate user may be based on a public page on the online social network associated with the candidate user (e.g., a page for a business associated with the candidate user). In one or more embodiments, the public page may be accessible by any user of the online social network. Alternatively, the public page may be accessible only by users of the online social network with a connection to the candidate user. In one or more embodiments, the social network data is collected using an API of the online social network. In one or more embodiments, an authorization token is obtained from the API of the online social network (e.g., after the established user logs into the online social network) in order to gain access to the social network data. For example, access to the public page of the candidate user may be obtained using the authorization token. The social network data may include the following information about the candidate user and/or a business associated with the candidate user: physical address, phone number, email address, additional contact information, and/or any other information relevant for setting up an account on the BMA.

In Step 304, one or more APIs for collecting public data about the candidate user are identified, using the social network data of the candidate user. In one or more embodiments, the public information source may be a third-party (e.g., government) information source. For example, an employer identification number (EIN) or corporation number for a business associated with the candidate user may be collected via an API provided by a government website. For example, the API may provide a capability to perform a keyword search for public data (e.g., where the keyword may be a name or partial name associated with the candidate user or with a business associated with the candidate user). In one or more embodiments, the public data may be any information required by the BMA to create an account for a new user.

In Step 306, public data corresponding to the candidate user is retrieved, using the user identifier and an API (e.g., an API identified in Step 304 above). In one or more embodiments, the API returns the public data in response to receiving an input that includes one or more keywords or identifiers associated with the candidate user. For example, the input may include the user identifier associated with the candidate user referenced in Step 300 above. Alternatively, the input may include one or more keywords (e.g., a name or partial name) associated with the candidate user or a business associated with the candidate user. In one or more embodiments, the retrieved public data may include an email address and/or other contact information of the candidate user.

Alternatively, instead of using an API to retrieve public data corresponding to the candidate user, the screen of a computing device used by the established user may be scraped as the established user peruses a website containing public information associated with the candidate user.

In Step 308, an account creation request including the user identifier is generated using the public data. The account creation request may include the contact information for the candidate user (e.g., email address, physical mailing address, name of the candidate user, an EIN associated with a business associated with the candidate user, etc.) and any information required by the BMA to create an account for a new user.

In Step 310, the account creation request is transmitted to the BMA. In one or more embodiments, the account creation request includes sufficient information for the BMA to create an account for the candidate user. In one or more embodiments, the account creation request may be included in an email message transmitted to the BMA (e.g., to an administrator of the BMA). In one or more embodiments, the account creation request may be transmitted to the BMA using an API of the BMA. In one or more embodiments, the candidate user may be notified (e.g., via email, text message, or any other form of electronic communication) that the account creation request has been transmitted to the BMA.

Those skilled in the art, and having the benefit of this Detailed Disclosure, will understand that Step 302, Step 304, Step 306, Step 308, and Step 310, of FIG. 3 may be executed for each candidate user identified in Step 300.

Figure 4:
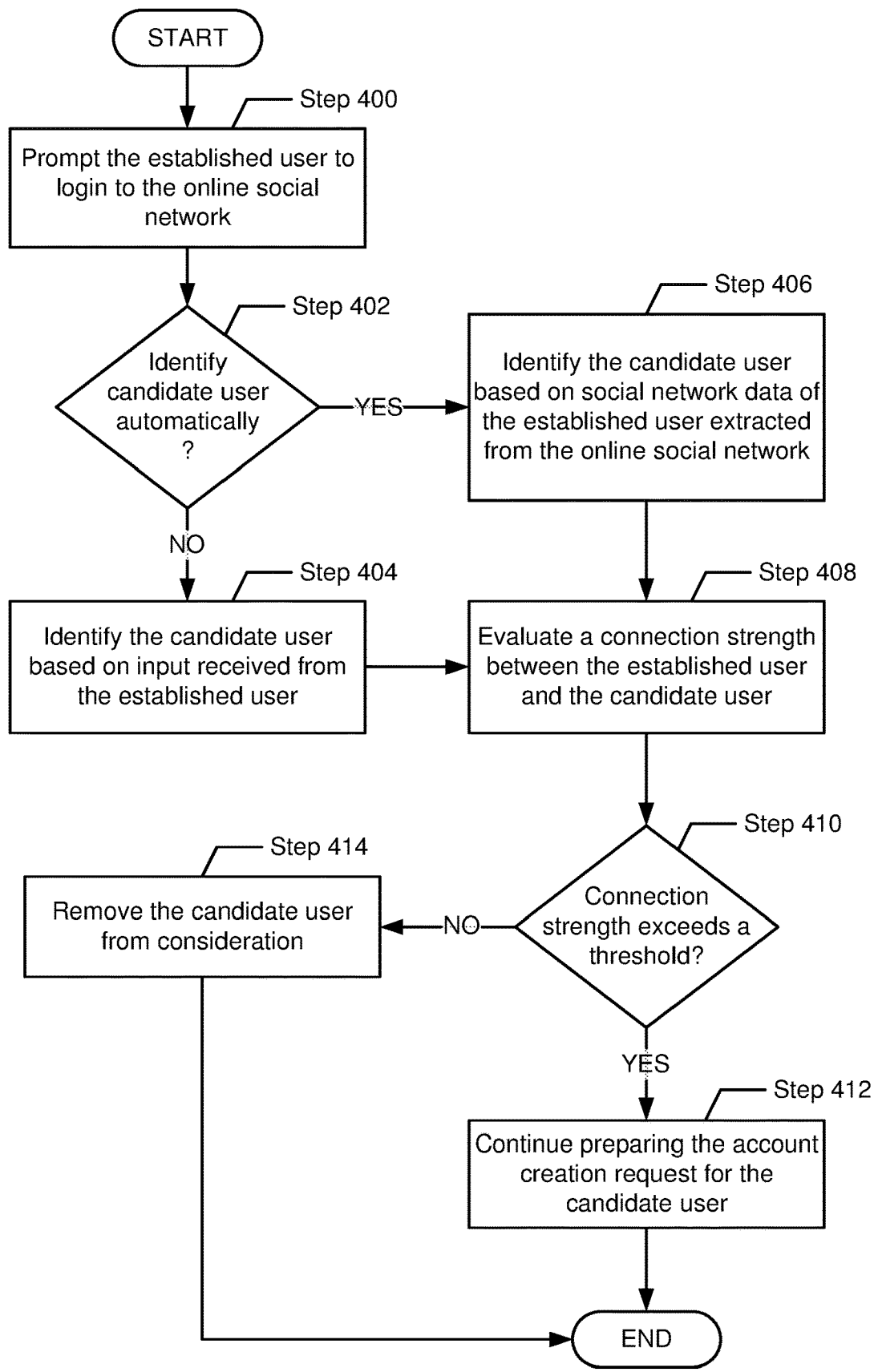

FIG. 4 shows a flowchart in accordance with one or more embodiments of the invention. The flowchart depicts a process for identifying a candidate user for a business management application (BMA). Moreover, the flowchart in FIG. 4 may correspond to Step 300 in FIG. 3. In one or more embodiments, the process described in reference to FIG. 4 may be practiced using the system (100) described in reference to FIG. 1 and FIG. 2 above, and/or involving the computing system (700) described in reference to FIG. 7A, and/or the client device (726) described in reference to FIG. 7B. In one or more embodiments of the invention, one or more of the steps shown in FIG. 4 may be omitted, repeated, and/or performed in a different order than the order shown in FIG. 4. Accordingly, the scope of the invention should not be considered limited to the specific arrangement of steps shown in FIG. 4.

Initially, in Step 400, the established user of a BMA is prompted to login to an online social network account of the established user. For example, the established user may be prompted to login to the online social network after clicking on a "Recommend Us" icon displayed on a user interface screen of the BMA. In one or more embodiments, a login page of the online social network may be displayed to the established user. In one or more embodiments, once the established user provides the required login credentials to the online social network, a token is obtained from the online social network that permits access to the online social network account of the established user. In one or more embodiments, the token provides access to a list of connections (e.g., friends) of the established user.

If, in Step 402, input is received from the established user indicating that the candidate user is to be identified automatically, then Step 406 below is performed. In one or more embodiments, the candidate user is identified automatically as a default option.

Otherwise, in Step 404, the candidate user is identified based on input received from the established user. In one or more embodiments, the candidate user may be a connection of the established user. For example, the candidate user may be identified based on receiving a selection, from the established user, of the candidate user from a list of connections of the established user. In one or more embodiments, a separate business page on the online social network may be associated with an account of the candidate user on the online social network. In one or more embodiments, a business page of the candidate user may be identified using an API of the online social network (e.g., by providing the API with an identifier or keyword associated with the candidate user). In one or more embodiments, the candidate user may be a business (e.g., a small business managed by an individual) that is a connection of the established user. Next, Step 408 below is performed.

In Step 406, the candidate user may be automatically identified based on social network data of the established user extracted from an online social network. For example, the established user may have posted, on the online social network, a review of a product or business associated with the candidate user. In one or more embodiments, the connections of the established user may be examined in order to determine which connections of the established user may have an associated business page on the online social network.

In Step 408, a connection strength between the established user and the candidate user is evaluated. In one or more embodiments, the evaluation is based on one or of the following: a number of common interests (e.g., as indicated in the respective social network profiles corresponding to the established user and the candidate user), a number of social network messages and/or posts exchanged between the established user and the candidate user, a number of common connections (e.g., friends), and a connection strength evaluation provided by an API of the online social network. In one or more embodiments, the evaluation is performed by the online social network (e.g., by providing the names of the established user and the candidate user to an API of the online social network).

If, in Step 410, it is determined that the connection strength exceeds a predetermined threshold, then in Step 412, generation of the account creation request continues (e.g., as in Step 302, Step 304, Step 306, Step 308, and Step 310 above). Otherwise, in Step 414, the candidate user is removed from consideration. Eliminating candidate users with a low connection strength relative to the established user may increase the likelihood that a candidate user will access the new BMA account created in response to the account creation request (e.g., the account creation request transmitted to the BMA in Step 310 above). For example, the candidate user may be less likely to view the unsolicited BMA account creation with suspicion if the account was created at the recommendation of a trusted social network connection (i.e., the established user).

Figure 5:
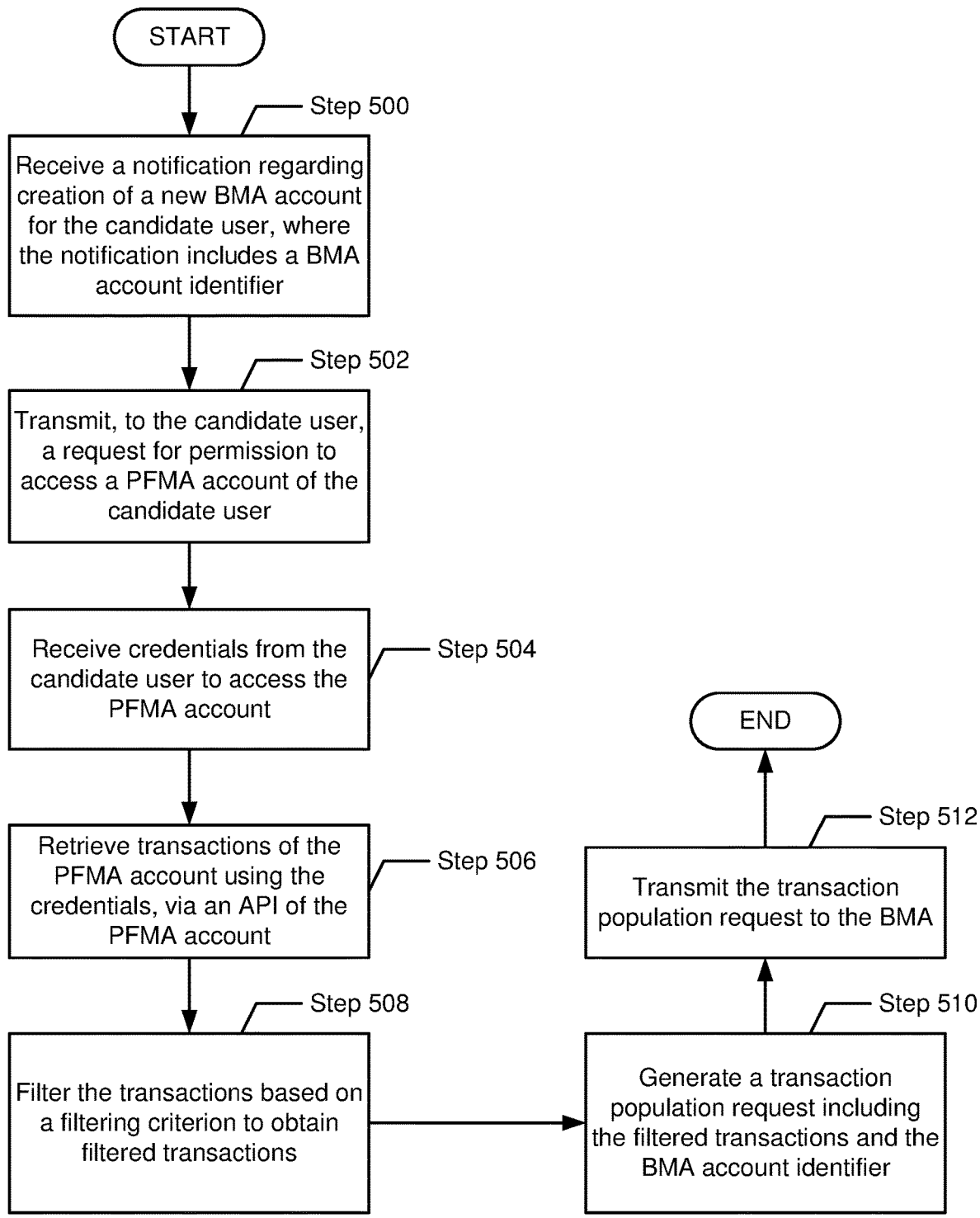

FIG. 5 shows a flowchart in accordance with one or more embodiments of the invention. The flowchart depicts a process for onboarding a candidate user for a business management application (BMA). In one or more embodiments, the process described in reference to FIG. 5 may be practiced using the system (100) described in reference to FIG. 1 and FIG. 2 above, and/or involving the computing system (700) described in reference to FIG. 7A, and/or the client device (726) described in reference to FIG. 7B. In one or more embodiments of the invention, one or more of the steps shown in FIG. 5 may be omitted, repeated, and/or performed in a different order than the order shown in FIG. 5. Accordingly, the scope of the invention should not be considered limited to the specific arrangement of steps shown in FIG. 5.

Initially, in Step 500, a notification is received from a BMA regarding creation of a new BMA account for the candidate user. In one or more embodiments, the notification is received in response to transmitting an account creation request to the BMA (e.g., as in Step 310 above). In one or more embodiments, the notification may be transmitted via email, text message, or any other form of electronic communication. In one or more embodiments, the notification may include a BMA account identifier associated with new BMA account.

In one or more embodiments, if the notification received from the BMA in Step 500 above indicates that the candidate user already has a BMA account, then the process described in FIG. 5 may be aborted. Alternatively, in one or more embodiments, if the notification received from the BMA in Step 500 indicates that the candidate user already has a BMA account and has rarely used the BMA account, then the process described in FIG. 5 may continue, with the aim of demonstrating the value of the BMA account to the candidate user. For example, in order to demonstrate the usefulness of the BMA account, a transaction population request may be transmitted to the BMA account (e.g., in Step 512 below).

In Step 502, a request for permission to access a PFMA account of the candidate user is transmitted to the candidate user. In one or more embodiments, the request for permission may be transmitted via email, text message, or any other form of electronic communication. In one or more embodiments, the PFMA account may track financial transactions in one or more accounts (e.g., credit card accounts, bank accounts, etc.) of the candidate user. In one or more embodiments, the request for permission may include a notification to the candidate user regarding the setup of the new BMA account for the candidate user. In one or more embodiments, the notification may include an embedded link that may be used by the candidate user to login to the new BMA account.

In Step 504, credentials for accessing the PFMA account are received from the candidate user. In one or more embodiments, the credentials may be received via email, text message, or any other form of electronic communication. In one or more embodiments, the credentials may include a PFMA account identifier (e.g., a username) and a password.

In one or more embodiments, the candidate user may indicate one or more transaction categories to be included in a filtering criterion (as described in Step 508 below), in addition to providing credentials.

In Step 506, transactions of the PFMA account are retrieved using the credentials, via an API of the PFMA account. In one or more embodiments, the API of the PFMA account returns transactions in response to receiving the credentials for accessing the PFMA account of the candidate user. In one or more embodiments, the API of the PFMA account may organize the transactions into categories (e.g., salary payments, business transactions, tax transactions, vendor payments, income, etc.). In one or more embodiments, the API of the PFMA account may generate unstructured transactions that are not organized into categories.

In one or more embodiments, one or more categorization rules may be used to organize the transactions retrieved from the PFMA account into categories (e.g., recurring payments to an individual may be categorized as payroll payments). In one or more embodiments, the API of the PFMA account may use a different set of transaction categories than the set of transaction categories used by the BMA, in which case one or more categorization rules may be used to match transaction categories used by the API of the PFMA to their corresponding transaction categories used by the BMA.

In Step 508, the transactions are filtered based on a filtering criterion, to obtain filtered transactions. In one or more embodiments, the filtering criterion may be predetermined. In one or more embodiments, the filtering criterion may be based on one or more filtering rules. For example, a filtering rule may specify that one or more transaction categories be included in the filtered transactions. In one or more embodiments, the filtering criterion may specify a time interval such that only the transactions dated within the time interval are included in the filtered transactions. In one or more embodiments, the filtering criterion may be provided by the candidate user (e.g., in Step 504 above).

In one or more embodiments, the filtering criterion may include a confidence measure based on a measure of the reliability of a transaction category associated with one or more transactions. In one or more embodiments, the transaction category may be based on one or more categorization rules, as described in Step 506 above. In one or more embodiments, the filtered transactions may include only those transactions in a transaction category whose associated confidence measure exceeds a predetermined threshold.

In one or more embodiments, the confidence measure may be based on a determination that a specific transaction relates to a business expense (i.e., not a personal expense) of the candidate user. For example, the determination may be based on analyzing keywords present in the specific transaction, and/or keywords present in metadata associated with the specific transaction.

In one or more embodiments, Step 506 and Step 508 may be combined into a single step. For example, the input provided to the API of the PFMA account may include the filtering criterion.

In Step 510, a transaction population request including the filtered transactions and the BMA account identifier is generated. For example, the filtered transactions included in the transaction population request may demonstrate to the candidate user, once the candidate user logs into the BMA, how actual business transactions (e.g., based on transactions of the candidate user extracted from a PFMA account of the candidate user) appear in the BMA, which may enhance the onboarding experience of the candidate user.

In Step 512, the transaction population request is transmitted to the BMA.

In one or more embodiments, the transaction population request may be transmitted to the BMA using an API of the BMA. In one or more embodiments, the filtered transactions may be transmitted to the BMA via email. In one or more embodiments, the candidate user may be notified that the transaction population request has been transmitted to the BMA.

The following example is for explanatory purposes only and not intended to limit the scope of the invention. FIG. 6A, FIG. 6B, FIG. 6C, FIG. 6D, FIG. 6E, and FIG. 6F show an implementation example in accordance with one or more embodiments of the invention.

Figure 6A:
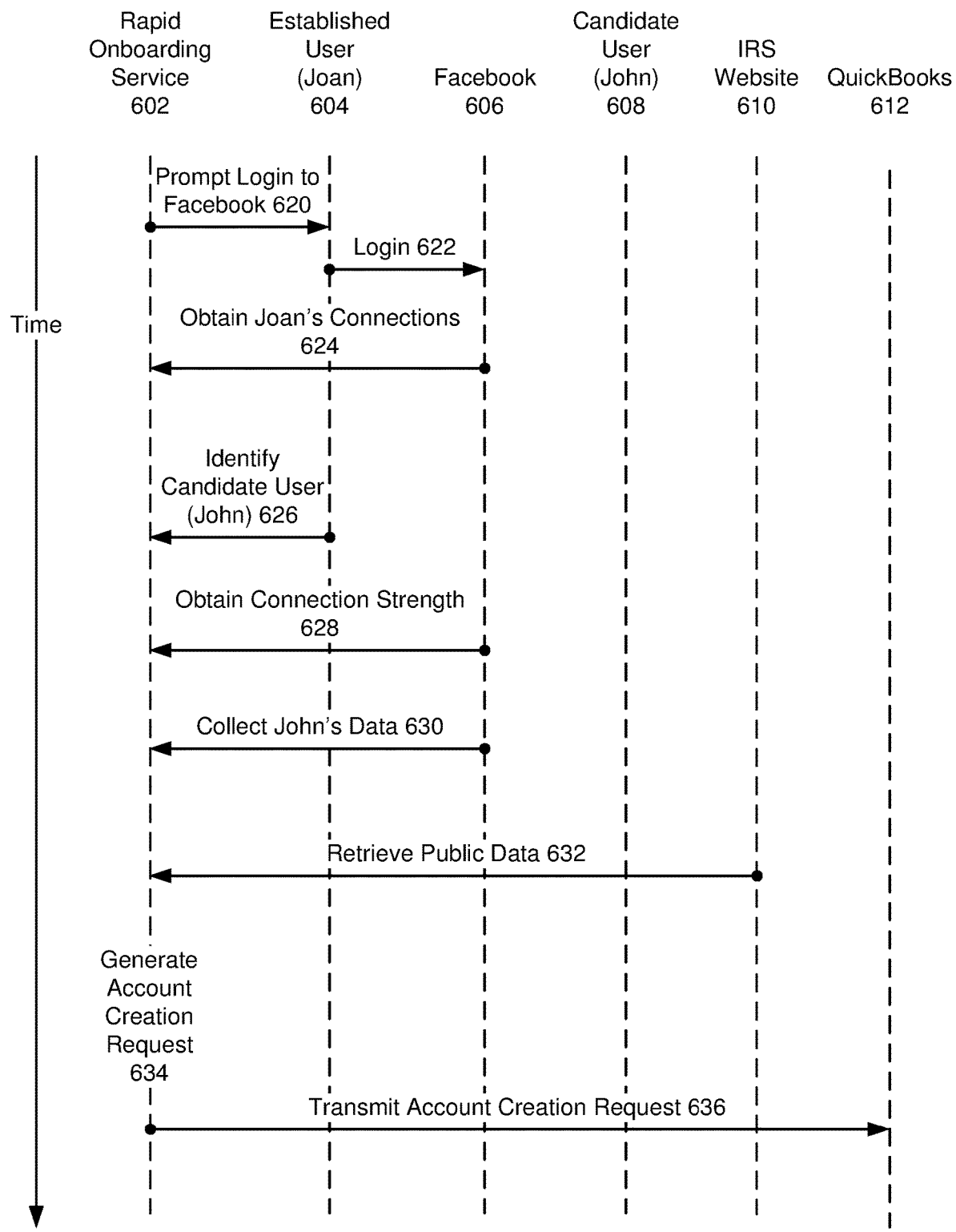
FIG. 6A, FIG. 6B, and FIG. 6C show examples in accordance with one or more embodiments of the invention.

FIG. 6A illustrates, in accordance with one or more embodiments, the relative timing of steps performed by various components of the system (100) of FIG. 1, in accordance with the flowcharts in FIG. 3 and FIG. 4. These components include: the rapid onboarding service (602) ((114) in FIG. 1), Joan, an established user (604) ((104) in FIG. 1) of QuickBooks (612), Facebook® (606) (online social network (108) in FIG. 1), John, a candidate user (608) ((106) in FIG. 1) of QuickBooks (612), an Internal Revenue Service (IRS) website (610) (third-party data source (110) in FIG. 1), and QuickBooks (612) (BMA (102) in FIG. 1).

Initially, in Step 620, the rapid onboarding service (602) prompts Joan (604) to login to her account on Facebook® (606), to begin the process of identifying a candidate user. In Step 622, Joan (604) logs into Facebook® (606), enabling the rapid onboarding service (602) to obtain access to Joan's account on Facebook® (606) (e.g., via a token from Facebook® (606) that permits access to Joan's account, including Joan's connections). In Step 624, based on a successful login by Joan (604), the connections of Joan (604) are retrieved by the rapid onboarding service (602) from Facebook® (606). In Step 626, Joan (604) identifies the candidate user, John (608), from the retrieved connections. Joan (604) knows that John (608) is a small business owner who does not use QuickBooks (612) or any other BMA to manage his business.

Alternatively, John (608) may be identified by the rapid onboarding service (602). For example, Joan (604) may have posted a review of a product or business associated with John's small business on Facebook® (606). Alternatively, the connections of Joan (604) may be examined by the rapid onboarding service (602) in order to identify that John (608) has a business page on Facebook® (606) (e.g., using an API of Facebook® (606) to identify which connections of Joan (604) have business related pages).

Continuing with FIG. 6A, in Step 628, the rapid onboarding service (602) obtains the connection strength between Joan and John from an API of Facebook® (606). In this scenario, the connection strength exceeds a predetermined level, suggesting a sufficient level of trust between Joan and John for the onboarding process to continue.

Alternatively, the connection strength may be evaluated by the rapid onboarding service (602) itself using various APIs of Facebook® (606). For example, the rapid onboarding service (602) may discover that Joan (604) and John (608) share a large number of interests, frequently comment on each other's posts, and frequently exchange messages.

In Step 630, the rapid onboarding service (602) collects data regarding John (608) from the business page associated with John's account on Facebook® (606), including a user identifier associated with John (608) (e.g., John's email address). The rapid onboarding service (602) collects additional information from Facebook® (606) regarding John (608), including the name of John's business and additional contact information for John's business.

In Step 632, the rapid onboarding service (602) retrieves the EIN corresponding to John's business from an API of the IRS website (610) by providing the name of John's business to the API. Other public data (e.g., additional data required by QuickBooks (612) to create a new account) corresponding to John's business is retrieved from additional APIs supported by other data sources by providing, as input, John's email address or other identifying information about John's business from Facebook® (606).

Figure 6B:
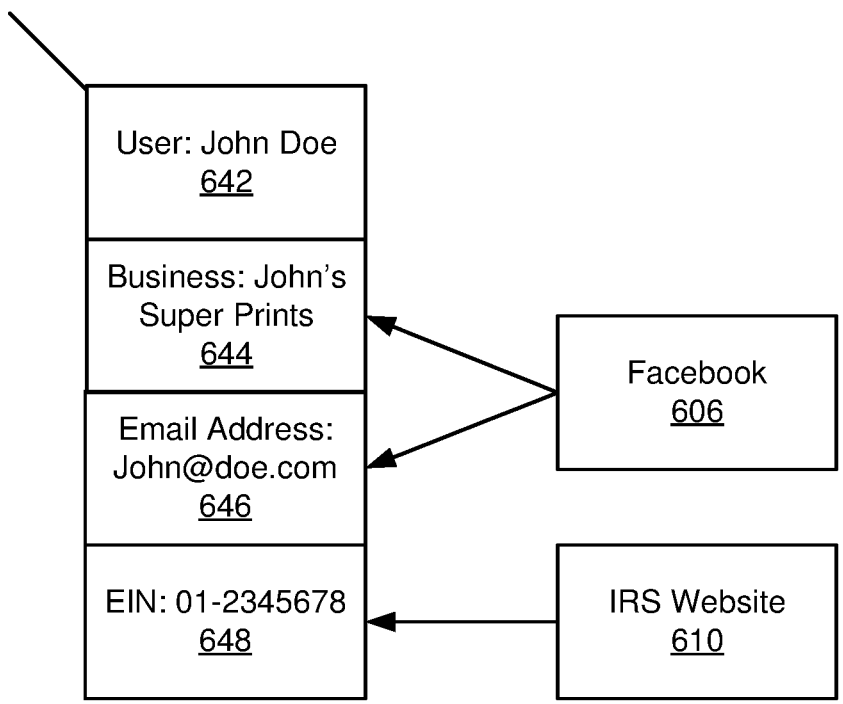

In Step 634, the rapid onboarding service (602) generates an account creation request using John's email address (i.e., the user identifier corresponding to John (608)), the EIN, and the contact information about John's business. FIG. 6B illustrates the account creation request (640) generated on behalf of John (642). FIG. 6B shows that the name of John's business (644) and John's email address (646) were obtained from Facebook® (606) and the EIN (648) (i.e., public data about John's business) was obtained from the IRS website (610).

Finally, returning to FIG. 6A, in Step 636, the rapid onboarding service (602) transmits the account creation request to QuickBooks (612). The account creation request may be transmitted via email or using an API of QuickBooks (612). John (608) is then notified via email (e.g., containing a link to login to QuickBooks (612)) that the account creation request has been transmitted to QuickBooks (612).

Step 628, Step 630, Step 632, Step 634, and Step 636, of FIG. 6A are then executed for additional candidate users identified in Step 626.

Figure 6C:
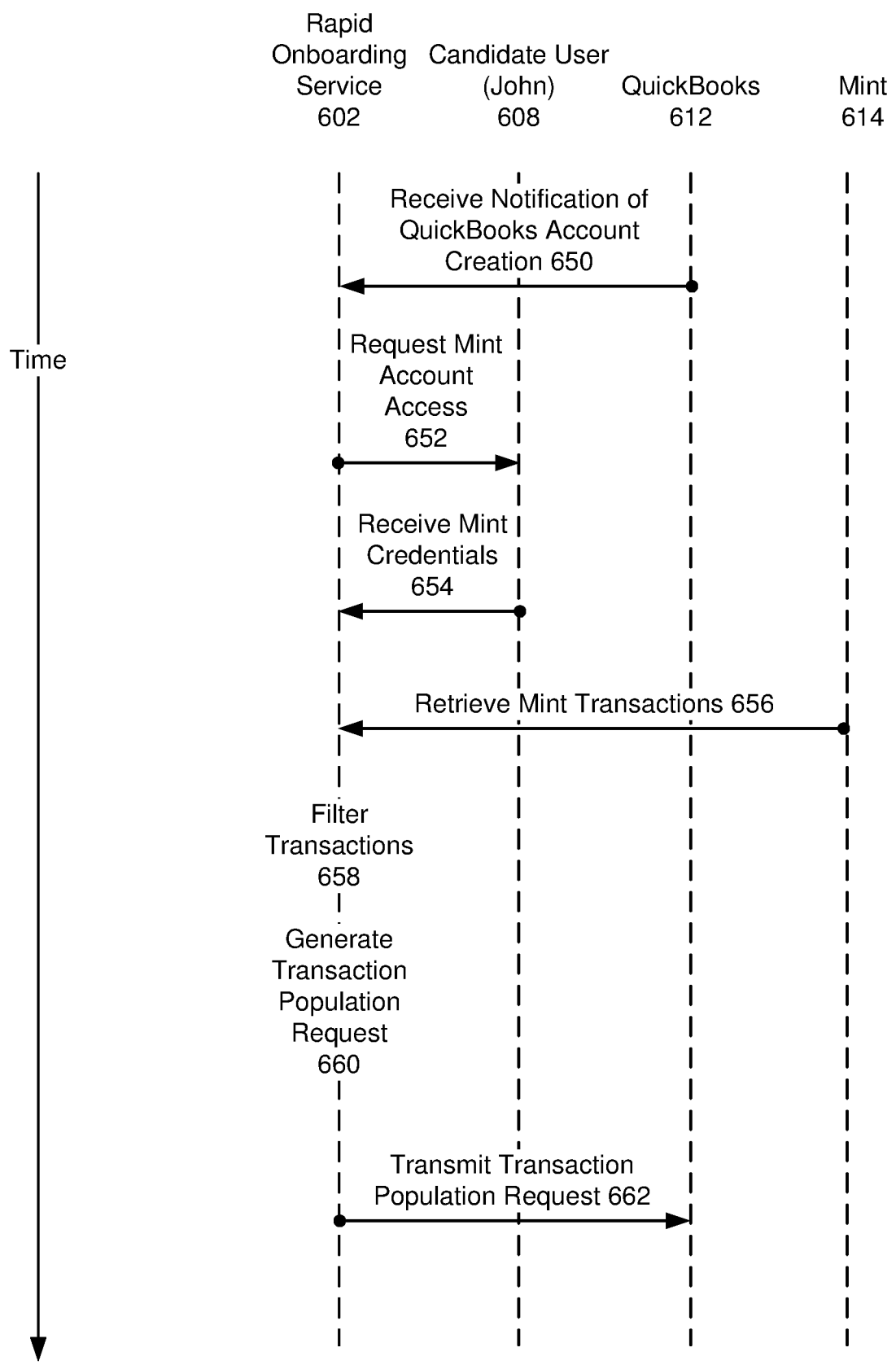

FIG. 6C illustrates, in accordance with one or more embodiments, the relative timing of steps performed by various components of the system (100) of FIG. 1, in accordance with the flowchart in FIG. 5. These components include: the rapid onboarding service (602), John, the candidate user (608), QuickBooks (612) (BMA (102) in FIG. 1), and Mint (614) (PFMA (112) in FIG. 1).

Figure 6D:
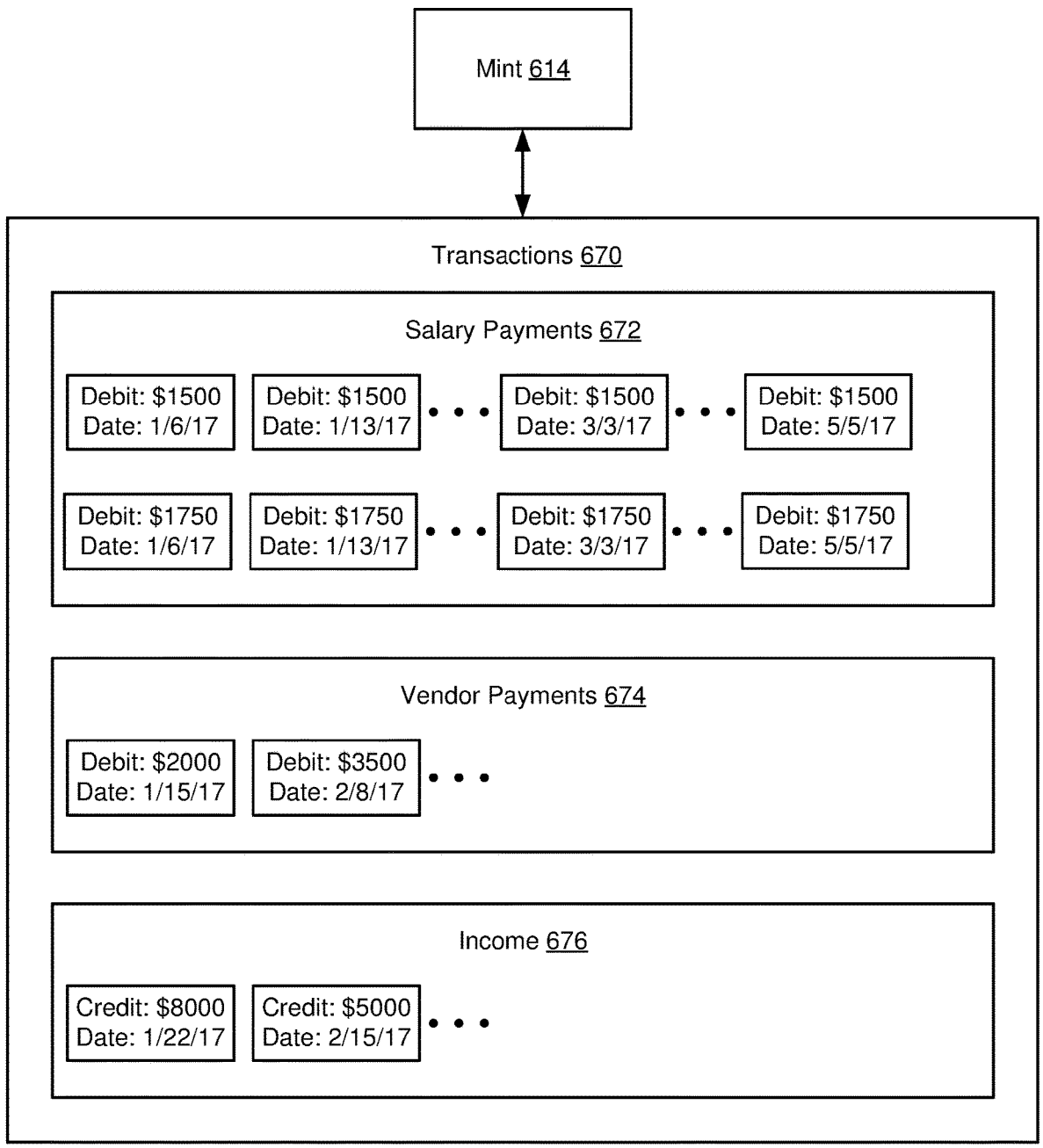
FIG. 6D, FIG. 6E, and FIG. 6F show examples in accordance with one or more embodiments of the invention.

Initially, in Step 650, the rapid onboarding service (602) receives a notification from QuickBooks (612) regarding the creation of John's QuickBooks account. The notification includes an account identifier, Johns_Super_Prints, associated with John's QuickBooks (612) account. In Step 652, the rapid onboarding service (602) sends an email to John (608) notifying John (608) of the new QuickBooks (612) account, and requesting permission to access John's Mint (614) account. John's Mint (614) account tracks John's various financial (e.g., banking and credit card) transactions. In response, in Step 654, the rapid onboarding service (602) receives John's Mint (614) account credentials (e.g., John's account identifier and password). In Step 656, the rapid onboarding service (602) retrieves John's Mint (614) account transactions via an API of Mint (614). FIG. 6D shows that the transactions (670) retrieved from Mint (614) are organized into categories, including: salary payments (672), vendor payments (674), and income (676).

Figure 6E:
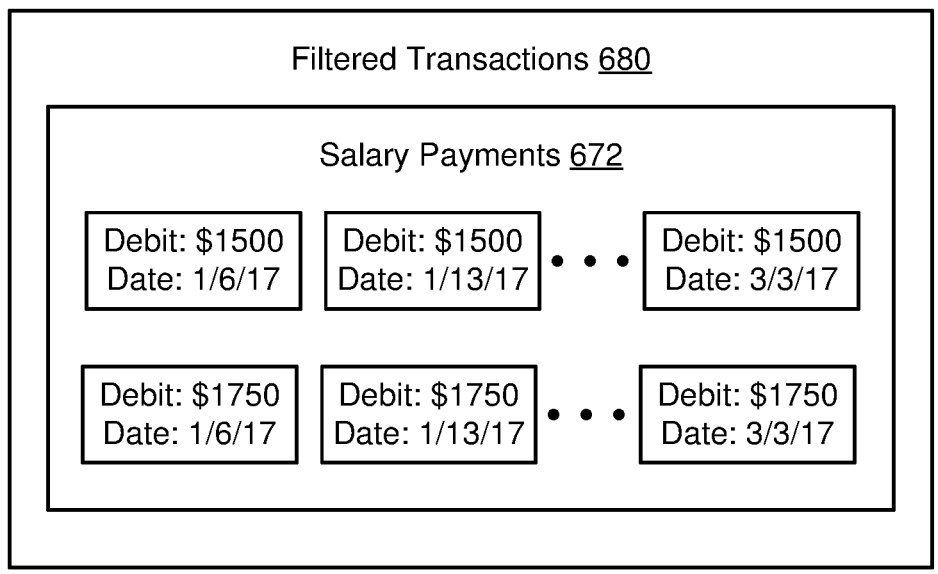

Returning to FIG. 6C, in Step 658, the rapid onboarding service (602) filters the retrieved transactions using a filtering criterion to obtain filtered transactions. FIG. 6E shows that the filtered transactions (680) consist of the most recent two months of salary payments (672) and vendor payments (674). That is, the filtered transactions (680) do not contain transactions in categories other than salary payments (672) (i.e., vendor payments (674) and income (676) of FIG. 6D have been excluded from the filtered transactions (680)) and the filtered transactions (680) do not contain transactions outside of the two month window. In this scenario, the filtering criterion was provided by John (608) in Step 654, when John (608) provided his Mint (614) account credentials.

In an alternate and non-limiting scenario, where John's PFMA did not organize transactions into categories, one or more categorization rules may be used to categorize John's transactions, relative to a confidence level. For example, weekly payments of the same amount may be categorized as salary payments, with a high level of confidence (e.g., 90%). However, if the payments occur in most, but not all weeks, then the categorization of salary payment may have a lower confidence level, depending on how frequently a weekly payment is skipped. For example, the payments might be to an independent (e.g., non-salaried) contractor with an irregular work schedule and an irregular payment schedule. Associating a confidence level with a transaction category used in the filtering criterion permits additional transactions to be filtered (e.g., the transactions that are less likely to match the transaction category specified in the filtering criterion may be filtered).

Figure 6F:

Returning to FIG. 6C, in Step 660, the rapid onboarding service (602) generates a transaction population request using John's account identifier, and the filtered transactions. FIG. 6F illustrates the transaction population request (690), which includes John's account identifier (692), John's email address (646) the EIN for John's business (648), and the filtered transactions (680).

Finally, returning to FIG. 6C, in Step 662, the rapid onboarding service (602) transmits (e.g., using an API of QuickBooks (612)) the transaction population request to QuickBooks (612). John (608) is then notified via an email message (e.g., containing a link to login to QuickBooks (612)) that the transaction population request has been transmitted to QuickBooks (612). The filtered transactions included in the transaction population request demonstrate, once John (608) logs into QuickBooks (612), how John's actual business related transactions would appear in QuickBooks (612), which may enhance John's onboarding experience and facilitate John's comfort with QuickBooks (612).

Figure 7A:
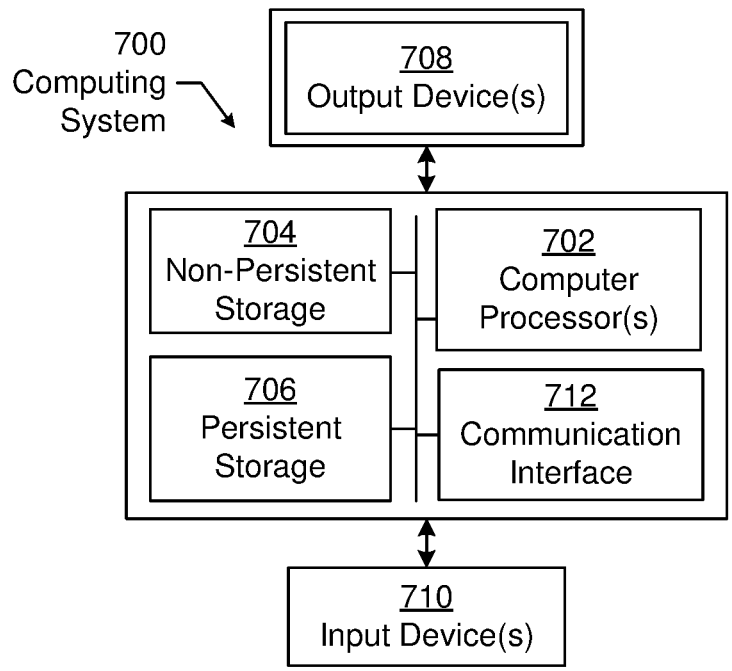
FIG. 7A and FIG. 7B show computing systems in accordance with one or more embodiments of the invention.

Embodiments disclosed herein may be implemented on a computing system. Any combination of mobile, desktop, server, router, switch, embedded device, or other types of hardware may be used. For example, as shown in FIG. 7A, the computing system (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (712) (e.g., Bluetooth interface, infrared interface, network interface, optical interface, etc.), and numerous other elements and functionalities.

The computer processor(s) (702) may be an integrated circuit for processing instructions. For example, the computer processor(s) may be one or more cores or micro-cores of a processor. The computing system (700) may also include one or more input devices (710), such as a touchscreen, keyboard, mouse, microphone, touchpad, electronic pen, or any other type of input device.

The communication interface (712) may include an integrated circuit for connecting the computing system (700) to a network (not shown) (e.g., a local area network (LAN), a wide area network (WAN) such as the Internet, mobile network, or any other type of network) and/or to another device, such as another computing device.

Further, the computing system (700) may include one or more output devices (708), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (702), non-persistent storage (704), and persistent storage (706). Many different types of computing systems exist, and the aforementioned input and output device(s) may take other forms.

Software instructions in the form of computer readable program code to perform embodiments disclosed herein may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments disclosed herein.

Figure 7B:
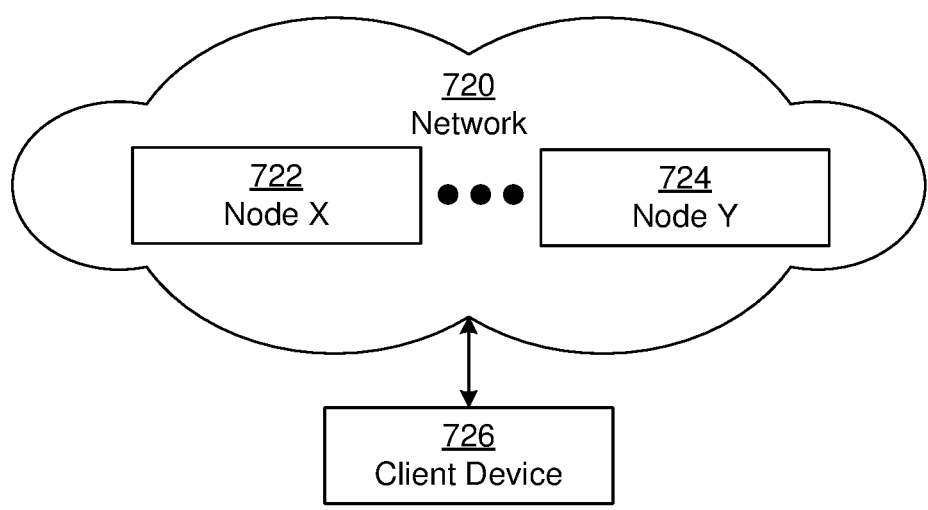

The computing system (700) in FIG. 7A may be connected to or be a part of a network. For example, as shown in FIG. 7B, the network (720) may include multiple nodes (e.g., node X (722), node Y (724)). Each node may correspond to a computing system, such as the computing system shown in FIG. 7A, or a group of nodes combined may correspond to the computing system shown in FIG. 7A. By way of an example, embodiments disclosed herein may be implemented on a node of a distributed system that is connected to other nodes. By way of another example, embodiments disclosed herein may be implemented on a distributed computing system having multiple nodes, where each portion disclosed herein may be located on a different node within the distributed computing system. Further, one or more elements of the aforementioned computing system (700) may be located at a remote location and connected to the other elements over a network.

Although not shown in FIG. 7B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (722), node Y (724)) in the network (720) may be configured to provide services for a client device (726). For example, the nodes may be part of a cloud computing system. The nodes may include functionality to receive requests from the client device (726) and transmit responses to the client device (726). The client device (726) may be a computing system, such as the computing system shown in FIG. 7A. Further, the client device (726) may include and/or perform all or a portion of one or more embodiments disclosed herein.

The computing system or group of computing systems described in FIGS. 7A and 7B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file.

The computing system in FIG. 7A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The above description of functions present only a few examples of functions performed by the computing system of FIG. 7A and the nodes and/or client device in FIG. 7B. Other functions may be performed using one or more embodiments disclosed herein.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method, comprising:
identifying a candidate user based on a connection to an established user of a business management application (BMA), wherein the candidate user has an associated user identifier;
collecting, using the associated user identifier, social network data of the candidate user from an online social network;
identifying, using the social network data of the candidate user, one or more application programming interfaces (APIs) for collecting public data about the candidate user;
retrieving, using the associated user identifier and an API of the one or more APIs, public data corresponding to the candidate user;
generating, using the public data corresponding to the candidate user, an account creation request comprising the associated user identifier;
transmitting the account creation request to the BMA;
retrieving, via an API of a personal financial management application (PFMA) account of the candidate user, transactions of the PFMA account;
generating a transaction population request by extracting, from the transactions, transactions corresponding to a transaction category; and transmitting the transaction population request to the BMA to cause creation of a new BMA account for the candidate user.

2. The method of claim 1, wherein identifying the candidate user based on the connection to the established user comprises:
automatically identifying the candidate user based on social network data of the established user extracted from the online social network.

3. The method of claim 1, further comprising:
receiving, in response to transmitting the account creation request to the BMA, a notification regarding creation of the new BMA account for the candidate user, wherein the notification comprises a BMA account identifier associated with the new BMA account;
transmitting, to the candidate user and in response to receiving the notification, a request for permission to access a personal financial management application (PFMA) account of the candidate user;
receiving, in response to the request for permission, credentials from the candidate user to access the PFMA account; and
filtering the plurality of transactions based on a filtering criterion to obtain a plurality of filtered transactions, wherein the transaction population request further comprises the BMA account identifier.

4. The method of claim 3, wherein the filtering criterion comprises:
determining whether a confidence measure associated with the transaction category associated with one or more of the plurality of transactions exceeds a predetermined threshold.

5. The method of claim 3, wherein the filtering criterion is received from the candidate user.

6. The method of claim 1, further comprising:
evaluating a connection strength between the established user and the candidate user; and
determining that the connection strength exceeds a predetermined threshold.

7. The method of claim 1, further comprising:
notifying the candidate user of the account creation request.

8. A system, comprising:
a computer processor;
a memory comprising instructions that, when executed by the computer processor, cause the computer processor to:
identify a candidate user based on a connection to an established user of a business management application (BMA), wherein the candidate user has an associated user identifier;
collect, using the associated user identifier, social network data of the candidate user from an online social network;
identify, using the social network data of the candidate user, one or more application programming interfaces (APIs) for collecting public data about the candidate user;
retrieve, using the associated user identifier and an API of the one or more APIs, public data corresponding to the candidate user;
generate, using the public data corresponding to the candidate user, an account creation request comprising the associated user identifier;
transmit the account creation request to the BMA;
retrieve, via an API of a personal financial management application (PFMA) account of the candidate user, transactions of the PFMA account;
generate a transaction population request by extracting, from the transactions, transactions corresponding to a transaction category; and
transmit the transaction population request to the BMA to cause creation of a new BMA account for the candidate user; and
a repository to store at least the public data about the candidate user and the account creation request.

9. The system of claim 8, wherein identifying the candidate user based on the connection to the established user comprises:
automatically identifying the candidate user based on social network data of the established user extracted from the online social network.

10. The system of claim 8, wherein the memory further comprises instructions that, when executed by the computer processor, cause the computer processor to:
receive, in response to transmitting the account creation request to the BMA, a notification regarding creation of the new BMA account for the candidate user, wherein the notification comprises a BMA account identifier associated with the new BMA account;
transmit, to the candidate user and in response to receiving the notification, a request for permission to access a personal financial management application (PFMA) account of the candidate user;
receive, in response to the request for permission, credentials from the candidate user to access the PFMA account; and
filter the plurality of transactions based on a filtering criterion to obtain a plurality of filtered transactions, wherein the transaction population request further comprises the BMA account identifier.

11. The system of claim 10, wherein the filtering criterion comprises:
determining whether a confidence measure associated with the transaction category associated with one or more of the plurality of transactions exceeds a predetermined threshold.

12. The system of claim 10, wherein the filtering criterion is received from the candidate user.

13. The system of claim 8, wherein the memory further comprises instructions that, when executed by the computer processor, cause the computer processor to:
evaluate a connection strength between the established user and the candidate user; and
determine that the connection strength exceeds a predetermined threshold.

14. The system of claim 8, wherein the memory further comprises instructions that, when executed by the processor, cause the processor to:
notify the candidate user of the account creation request.

15. A non-transitory computer readable medium comprising instructions that, when executed by a computer processor, perform a method comprising:
identifying a candidate user based on a connection to an established user of a business management application (BMA), wherein the candidate user has an associated user identifier;
collecting, using the associated user identifier, social network data of the candidate user from an online social network;

identifying, using the social network data of the candidate user, one or more application programming interfaces (APIs) for collecting public data about the candidate user;

retrieving, using the associated user identifier and an API of the one or more APIs, public data corresponding to the candidate user;

generating, using the public data corresponding to the candidate user, an account creation request comprising the associated user identifier;

transmitting the account creation request to the BMA;

retrieving, via an API of a personal financial management application (PFMA) account of the candidate user, transactions of the PFMA account;

generating a transaction population request by extracting, from the transactions, transactions corresponding to a transaction category to cause creation of a new BMA account for the candidate user; and transmitting the transaction population request to the BMA.

16. The non-transitory computer readable medium of claim 15, wherein identifying the candidate user based on the connection to the established user comprises:

automatically identifying the candidate user based on social network data of the established user extracted from the online social network.

17. The non-transitory computer readable medium of claim 15, the method further comprising:

receiving, in response to transmitting the account creation request to the BMA, a notification regarding creation of the new BMA account for the candidate user, wherein the notification comprises a BMA account identifier associated with the new BMA account;

transmitting, to the candidate user and in response to receiving the notification, a request for permission to access a personal financial management application (PFMA) account of the candidate user;

receiving, in response to the request for permission, credentials from the candidate user to access the PFMA account; and filtering the plurality of transactions based on a filtering criterion to obtain a plurality of filtered transactions, wherein the transaction population request further comprises the BMA account identifier.

18. The non-transitory computer readable medium of claim 17, wherein the filtering criterion comprises:

determining whether a confidence measure associated with the transaction category associated with one or more of the plurality of transactions exceeds a predetermined threshold.

19. The non-transitory computer readable medium of claim 17, wherein the filtering criterion is received from the candidate user.

20. The non-transitory computer readable medium of claim 15, the method further comprising:

notifying the candidate user of the account creation request.

* * * * *